July 14, 1959 J. BIALEK 2,895,112

DELAY LINE

Filed May 17, 1955

INVENTOR.
JACQUES BIALEK

BY Ostrolenk, Faber, Gerb & Soffen

ATTORNEYS

United States Patent Office 2,895,112

Patented July 14, 1959

2,895,112

DELAY LINE

Jacques Bialek, South Pasadena, Calif., assignor to Standard Coil Products Co., Inc., Los Angeles, Calif., a corporation of Illinois Application May 17, 1955, Serial No. 508,993

5 Claims. (Cl. 333—31)

This invention relates to an electrical delay line, and more particularly, relates to a novel time delay network capable of uniform phase delay of predetermined duration for a wide signal band of the order of megacycles. A delay line is used to delay the signals in an electrical circuit usually by a prescribed amount. Dependent on the system, such signal could be electrical pulses, a communication signal band, a television signal, etc.

The present invention is particularly directed to a novel delay line for a wide signal band, such as resulting from an electrical pulse with high harmonic content, or a television receiver signal, more particularly for color television. A color television signal (other than the carrier), contains the luminance portion of the picture signal (black and white picture), and the chrominance (color) portion of the picture, and components of the frame frequency at 60 cycles. Such television receiver signal band accordingly contains signal components from 60 cycles up to approximately 4 megacycles.

In modern color television receiver circuitry, the luminance portion of the picture signal must be delayed by eight-tenths microsecond, so that it arrives at the picture tube at the same time that the chrominance portion of the picture reaches there. The delay line is suitably inserted in the receiver circuit to produce the necessary time delay of the luminance signal. It is important that all the frequency components passing through the delay line network be delayed equally, since any unbalance or unequal delay of frequency components causes misregistration of the picture. It is also important that the delay line introduce a minimum of insertion loss in the circuit, and that such losses be equal throughout the frequency range being delayed.

An object of the present invention is to provide a novel electrical delay line that uniformly delays the phase of a broad signal band over its full frequency range.

Another object of the present invention is to provide a novel electrical delay line which uniformly delays the luminance portion of color television signals by an amount of the order of eight-tenths microsecond.

A further object of the present invention is to provide a novel electrical delay line for a wide frequency band with minimum insertion loss, and which loss is substantially equal throughout the frequency range being delayed.

An electrical delay line suitable for color television receivers requires an impedance sufficiently high to effectively match the output impedance of a suitable vacuum tube amplifier used in the receiver circuit. One such impedance used in modern color television receivers is, for example, 4100 ohms. The construction of the delay line of the present invention is particularly suited for designs whereby its impedance can readily be made of the order of 4100 ohms. Furthermore, the simplicity of construction and component elements of the invention delay line lends itself to ready minor change to accommodate production variation in wire gauge or in tubes, without obsolescence of stock, and yet provide the proscribed functions.

The electrical delay line of the present invention utilizes a novel combination of electrical wire and an insulating tube such as phenolic or other materials, in which the loss factor is low, up to 4 to 5 megacycles, resulting in a delay line having effective distributed electrical inductance and capacity constants. Prior art electrical delay lines were usually made with a number of discrete coils or inductances connected in series with discrete capacitors between their junction points and a grounded portion of the circuit. However, the use of discrete inductances and capacitors is rendered obsolete for a delay line having characteristics required and accomplished by the line of the present invention. Attempts have been made for making uniform wide band electrical delay lines, utilizing screening and printed or etched circuitry. These latter methods were also found to be relatively expensive for the requirements of a wide band low-loss uniform delay line in accordance with the invention.

It is accordingly a further object of the present invention to provide a novel, electrical delay line for wide band signal range, constructed fundamentally of electrical wire and an insulating tube.

It is another object of the present invention to provide a novel electrical delay line capable of relative high impedance design, and providing uniform phase delay over a relatively wide signal band.

It is a still further object of the present invention to provide a novel electrical delay line utilizing electrical wire and an insulating tube in construction affording a line with distributed inductances and capacities that result in a uniform phase delay for a wide signal band.

It is another object of the present invention to provide an electrical delay line of simple and inexpensive construction utilizing components that are readily changeable in its final design to accommodate differing tolerances of the elements thereof.

These and further objects of the present invention will become more apparent from the description thereof, taken in connection with the drawings in which.

Figure 1:
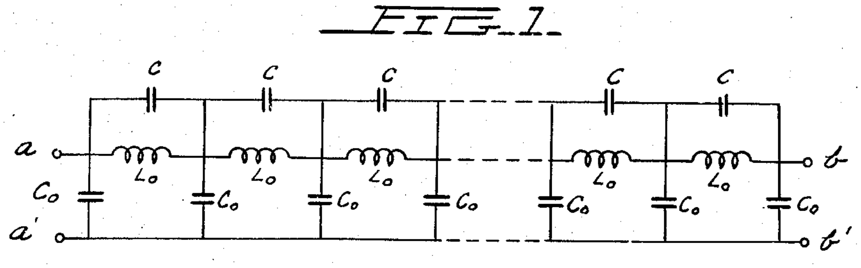
Figure 1 is an electrical schematic diagram of a conventional delay line.

In a conventional electrical delay line, particularly one used for a relatively narrow band of frequencies, or for frequencies of the order of kilocycles, such as in long lines telephony, a well understood combination of inductances and capacities is employed. One well known and widely used form of an electrical delay line is schematically illustrated in Figure 1, wherein $L_0$ are discrete or integral inductances connected in series between input terminal *a* and output terminal *b*. At each of the junction points of inductances $L_0$ is connected a discrete or integral condenser $C_0$. The opposite terminal of each condenser $C_0$ is connected to a common ground line between input terminal *a'* and output terminal *b'*. To improve the efficiency and performance of the delay line compensating condensers are often used, corresponding to discrete condensers, *c* connected across each of inductance coils $L_0$.

The use of integral or discrete inductances and capacities corresponding to $L_0$, $C_0$, and *c* of the conventional delay line shown in Figure 1, limits the range of frequencies of the signal band using it, and is impractical where the signal frequency band is of the order of megacycles. Where it is desired to uniformly delay an electrical pulse having a sharp configuration with high harmonic content, or the luminance portion of a color television signal, and where a minimum insertion loss by an amount uniformly throughout the wide frequency band is required, a delay line is indicated that has distributed constants with an effective infinite number of inductances and capacities interconnected. The present invention is particularly directed to a novel design and construction of an electrical delay line having such distributed constants, and providing uniform delay, and relatively low and uniform insertion loss over a wide frequency range.

Figure 2:
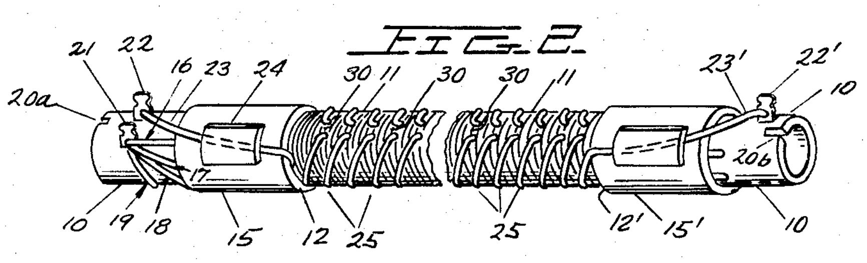
Figure 2 is a perspective view of one embodiment of an electrical delay line of the present invention.

Referring now to Figure 2, a preferred embodiment of the present invention is illustrated in perspective. Copper wire is used, preferably of as small diameter as is commercially available in uniform gauge. Insulated wire of 42 Brown & Sharpe gauge has been found practical for the invention line. The insulation may be enamel, Formvar, silk or cotton, as desired, and as best usable in the production machinery.

The cylinder 10 of the delay line is a commercial phenolic tube of good dielectric constant, of a length substantially longer than its diameter. For an electrical delay line usable in a color television receiver, for delaying the luminance portion of the signal by eight-tenths microsecond, and having an impedance of 4100 ohms, a preferred form 10 was used having an overall length of eleven inches and having an outside diameter of three-eighths inch. In this embodiment, the inductance winding 11 thereon, to be further detailed, was wound closely between the inside edges 12, 12', of insulation tape 15, 15' wound near the opposite ends of 10. In the described construction, the distance between points 12, 12' was nine and one-quarter inches. Thus, in this particular application of the invention, the overall length of the coil form 10 was about thirty times the outside diameter thereof; and the effective length of the inductance coil 11 thereon was about twenty-five times that of the diameter on which coil 11 was wound. It is to be understood that dimensions or proportions of such lengths to diameter may be different, as will now be apparent to those skilled in the art, without limiting the invention herein.

Figures 3, 4, 5:
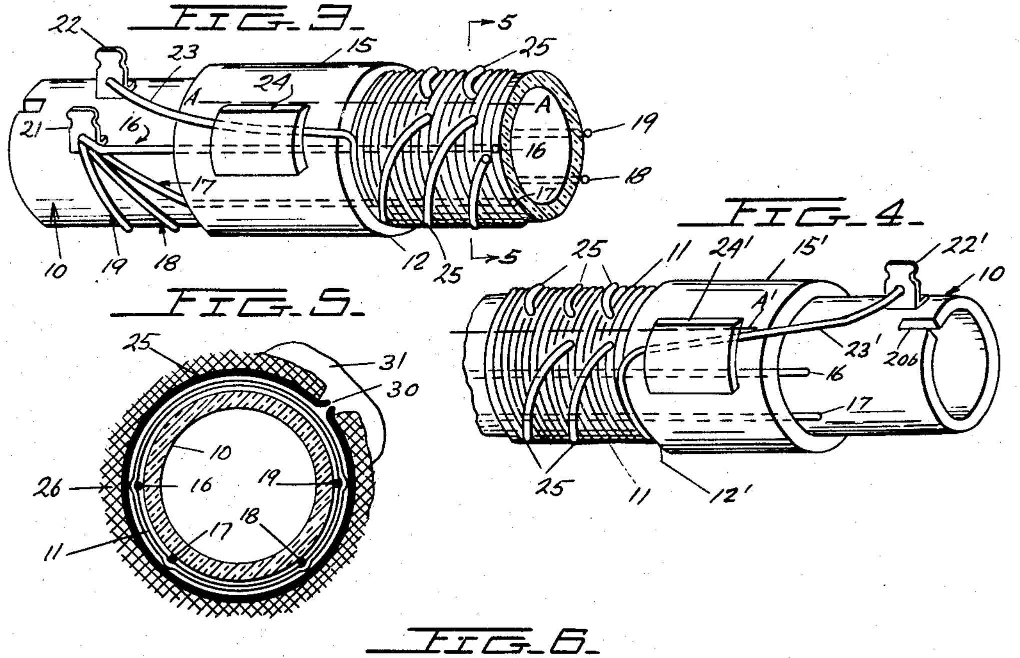
Figure 3 is an enlarged perspective view of one end of the electrical delay line of the present invention.
Figure 4 is an enlarged perspective view of the opposite end of electrical delay line of Figure 3.
Figure 5 is a cross-sectional view through the electrical delay line of Figure 3, as taken along line 5—5 thereof.

Figures 3 and 4 are enlarged perspective views of the left and right ends respectively of the delay line shown in Figure 2, with the relative dimensions of the tape 15, 15' being foreshortened for more ready illustration of details of the delay line. Four lengths 16, 17, 18, 19 of wire are strung along the outside surface of the tube 10, in a spaced relation, as may be clearly seen in Figures 3 and 4. These wire strings are preferably of the same small guage as coil 11, and accordingly, placed along the surface of tube 10 prior to the winding thereon of inductance 11. These strands or wire lengths 16, 17, 18, 19 constitute capacity elements of the invention delay line, as will be more thoroughly set forth hereinafter, and are here termed "capacity wires."

All the left hand ends of capacity wires 16, 17, 18, 19 (Figures 2 and 3) are soldered to a terminal lug 21. Lug 21 is suitably mounted at the adjacent end portion of tube 10 in the usual coil art manner. Capacity wires 16 to 19 are stretched longitudinally along tube 10 and are fastened to tube 10 at the right end by tape band 15'. The right hand ends of the capacity wires 16 to 19 are severed at band 15' as seen in Figure 4. The exemplary illustrated embodiment of the delay line embodies four parallel capacity wires (16 to 19), spaced and parallel with the axis of tube 10.

It is to be understood that wires 16 to 19 may be arcuately drawn about tube 10, and spaced at different values than shown; and that more or less in number to that shown may be effectively used. It is to be further understood that capacity wires 16 to 19 may be mounted on tube 10 in any suitable manner. Notches may be provided in the ends of tube 10 and a long wire threaded between such notched ends to constitute a capacity wire group. In mass production of the insertion unit, a jig may be used securing the capacity wires (16 to 19) in position while winding the inductance 11 thereover. The invention herein is not limited to the number, arrangement or method of application of the capacity wires per se.

A second terminal lug 22 is secured to coil form 10, spaced from lug 21 and constitutes a terminal connection of the inductance section of the delay line. The inductance section of the invention delay line is fabricated on coil 10 as follows: The first end 23 of the wire for coil 11 is secured in place, such as by a patch of tape 24 against tape 15. Wire end 23 is electrically connected to terminal lug 22. The wire for coil 10, as referred to above, is preferably 42 B.&S. gauge, for the described parameter line. Coil 11 is helically wound on the surface of form 10, as a layer winding, close or spaced, with a nominal number of turns per inch, between the facing edges 12, 12' of tape bands 15, 15'. The far end 23' of coil 11 is secured, preferably as shown in Figure 4, by a tape patch 24' on tape band 15'. End 23' of coil 11 is electrically connected to lug 22' suitably mounted on form 10, and constitutes the opposite or output connection to the delay line.

The next step in the fabrication of the delay line is to stretch or otherwise temporarily mount a wire of heavier gauge than the aforesaid wires, such as between opposing slots $20_a$ and $20_b$ shown in Figures 3 and 4. The referred to position is indicated by broken line A, A', its use is solely in manufacturing and does not remain with the final product as will be apparent hereinafter. A second winding to be described is then wound on top of inductance winding 11. This second winding is to become the compensation components of the delay line as is indicated at 25 in the drawings. The gauge of wire for compensation winding (25) is preferably the same as that of coil 11, and capacity wires 16, 17, 18, 19, namely 42 B.&S. gauge. In the described embodiment to obtain the physical parameters described in connection with Figure 2 hereinabove, compensation components 25 are constructed by winding 42 gauge wire helically around coil 11 with a pitch of one-quarter inch, namely four turns per inch, along the nine and one-quarter inch length between tape ends 12, 12'. Both ends of the compensation winding (25) are thereupon suitably fastened. The loops 25, 25 are formed later, The next step is to preheat the delay line and impregnate with "Q Max," and otherwise finalizing the coil for commercial use in the field. As seen in the enlarged cross-sectional view, Figure 5, the resultant impregnated insulation layer 26 extends fully about all of the wires, including 11, and 16, 17, 18, 19, and 25. The severing wire at position A, A' is then lifted and removed from the coil in a manner to split each turn of the compensation winding to provide loops of wires 25, 25 as seen in the drawings, open ended along line A, A'. The outer pitched winding (25) is resultantly formed into a series of helical loops 25, 25 each having a split opening 30.

A series of integral open-ended loops is thus provided regularly contacting each successive closely spaced turn of inductance 11 throughout its length. The purpose of open loops 25, 25 is to form an effectively distributed compensating capacitance for the effectively distributed inductance 11. Each coil loop 25 is open-ended and distinct from the next successive coil loop 25. Each coil loop 25 is substantially one turn of wire held in place on coil form 11 by the impregnation material 26. The open ends 30 of compensation loops 25, 25 are set into place by, for example, brushing along the dashed line A, A' (after loops 25, 25 are severed) with a suitable impregnating material 31. The brushing is done in such a way as to lay apart the ends 30 of each loop 25 so as to be free of any electrical short circuits.

For other applications, than those hereinstated, or for other form factors of the delay line, when more compensation effect is required from elements 25, the initial single layer spaced winding 25 is replaced by several layers wound back and forth over inductance winding 11. When three or more such layers of compensation wires are wound, two or more of said layers are parallel. A spacing is then provided between parallel layers because two parallel wires wound close (like a bifalar) does not provide much more compensation than a single wire. Whatever the number of layers is used as the compensation winding, they are finally split in the manner described for the single layer (25) along A, A'.

Figure 6:
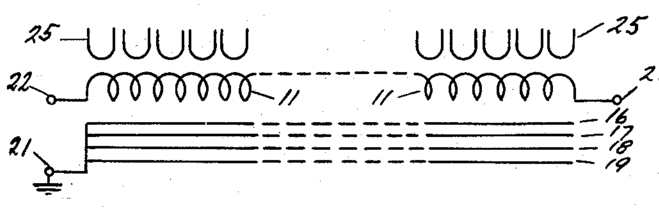
Figure 6 is a schematic electrical diagram of the delay line corresponding to the present invention.

The electrical delay line of the invention may be represented by the schematic diagram Figure 6 thereof. The coil 11 has each winding thereof contiguous with a minute section of each of the capacity wires 16, 17, 18, 19. Each turn of coil 11 thus has an effective capacitance of predetermined value to the capacity wires. The capacity wires are connected to ground through terminal 21, and are all in common electrical interconnection. Each compensation loop 25 of the invention delay line embraces a definite number of turns in its quarter inch pitch along coil 10, and is contiguous with the winding of coil 11. Each turn of coil 11 is thus capacitatively coupled by a predetermined small amount with its subtended loop 25. Compensating loops 25 accordingly form a prescribed distributed compensation capacitance effect for the effectively distributed inductance of coil 11. The compensating loops 25, being open-ended, produce no eddy currents or electrical loss in the delay line.

It will now be understood by those skilled in the art that the delay line of the invention, as hereinabove described, constitutes an inductance where each turn of its winding is effectively a separate inductor, corresponding to $L_0$ of Figure 1; each turn of winding 11 has a contiguous relationship with capacity wires 16, 17, 18, 19 that form capacity elements for the long line to ground corresponding to $C_0$ in Figure 1. The compensation loops 25, being contiguous with each successive turn of coil 11, and capacitatively related thereto, form a prescribed compensation capacitance between the turns of winding 11 and effectively correspond to *c* of Figure 1. It is to be understood that the value of each elemental inductance depends upon the winding pitch and upon the diameter of coil 11; the value of the inductance-to-ground capacities on the number of capacity wires (16, 17, 18, 19) used; and the value of the compensation effect of loops 25, 25 on the pitch of its winding and the number of such loops used.

In effect, the described physical dimensions of the embodiment, set forth for illustrative purposes, represents an electrical delay line with an impedance of 4100 ohms, and with a uniform time or phase delay for the full luminance signal component of a color television signal, including components as low as 60 cycles and up to close to 4 megacycles.

The insertion loss of the invention line is negligible, and is substantially uniform throughout the range of the signals referred to. The stability of the invention delay line, its pulse rise time, pulse decay time, overshoot, undershoot, and freedom from spurious responses have been found very satisfactory and practical in commercial utilization. The relative simplicity of its manufacture results in inexpensive fabrication.

It is to be understood that while the present invention has been described in connection with a particular embodiment thereof, and also with specific parameters as well, further embodiments will now be apparent to those skilled in the art that are within the scope of the invention which is not intended to be limited except as set forth in the following claims.

I claim:

1. An electrical delay line for uniformly delaying a signal band extending to the order of several megacycles comprising a dielectric tube of length substantially greater than its diameter, insulated conductive wire wound helically about the surface of said tube to provide a predetermined distributed inductance winding for the line, a series of spaced wires arranged along said tube between said wound wire and the surface of said tube to provide a distributed capacitance coupled to said wound wire uniformly along its inductance, and a plurality of compensating capacity wire loop elements insulated from one another wound longitudinally spaced upon said wound wire and wound with a coarser pitch than said wound wire, the interrelationship of said wound wire and said series of wires providing a delay line effectively having an infinite number of inductances connected in series from one end to the other of said wires with corresponding capacities each effectively connected to each of such inductances whereby a uniform delay is effective throughout the signal band, said loop elements each being arranged to encompass a plurality of turns of the wound wire successively along the winding and provide uniform compensating capacitance therefor to improve the line action.

2. An electrical delay line for uniformly delaying a signal band extending to the order of several megacycles comprising a dielectric tube of length substantially greater than its diameter, conductive wire wound about the surface of said tube to provide a predetermined distributed inductance winding for the line, a series of spaced wires arranged along said tube between said wound wire and the surface of said tube to provide a distributed capacitance coupled to said wound wire uniformly along its inductance, and a plurality of open-ended conductive wire loops electrically insulated from each other and mounted upon said wound wire in a longitudinally spaced relationship to provide individually insulated compensating capacities between the effective inductances of the wound wire all along the surface thereof to substantially improve the action of the line, each loop of said plurality of wire loops having an opening being a small fraction of the circumference of said loop; each of said wire loops skewed with respect to said inductance winding to thereby encompass a plurality of turns of said inductance winding.

3. An electrical delay line of relatively high impedance for uniformly delaying a signal band extending to the order of several megacycles by a time delay of the order of microseconds comprising a cylindrical tube of length many times greater than its diameter, conductive wire wound about the surface of said tube to provide a predetermined distributed inductance winding for the line, a series of spaced wires arranged along said tube beneath said winding, said wires being electrically interconnected to provide a distributed capacitance coupled to said winding uniformly along its inductance, and a plurality of open-ended conductive wire loops wound upon said winding and skewed with respect thereto in a longitudinally spaced relationship to provide compensating capacities between the effective inductances of the winding along the surface thereof to substantially improve the action of the line, the interrelationship of said winding and said series of wires providing a delay line effectively having an infinite number of inductances connected in series from one end to the other of said wires with corresponding capacities each effectively connected to each of such inductances whereby a uniform delay is effective throughout the signal band.

4. An electrical delay line of relatively high impedance for uniformly delaying a television signal band extending to the order of several megacycles by a time delay of the order of a fraction of a microsecond comprising a cylindrical tube of length many times greater than its diameter, conductive wire of fine gauge wound about the surface of said tube to provide a predetermined distributed inductance winding for the line, a series of fine gauge spaced wires longitudinally arranged along said tube between said winding and the surface of said tube, said wires being electrically interconnected to provide a distributed capacitance coupled to said winding uniformly along its inductance, and a plurality of open-ended conductive wire loops wound upon said winding in a longitudinally spaced relationship; each of said wire loops encompassing a plurality of loops of said inductive winding to provide compensating capacities between the effective inductances of the winding along the surface thereof to substantially improve the action of the line, the interrelationship of said winding and said series of wires providing a delay line effectively having an infinite number of inductances connected in series from one end to the other of said wires with corresponding capacities each effectively connected to each of such inductances whereby a uniform delay is effective throughout the signal band.

5. An electrical delay line comprising a tube of length substantially greater than its diameter, conductive wire wound about the surface of said tube to provide a predetermined distributed inductance winding for the line, a series of spaced linear conductors arranged along said tube to provide a distributed capacitance coupled to said wound wire along its inductance, and a plurality of open-ended conductive wire loops of small gauge wound upon said wound wire in a longitudinally spaced relationship; each of said wire loops encompassing a plurality of loops of said inductive winding to provide compensating capacities between the effective inductances of the wound wire all along the surface thereof to substantially improve the action of the line, the interrelationship of said wound wire and said series of linear conductors providing a delay line effectively having an infinite number of inductances connected in series from one end to the other of said linear conductors with corresponding capacities each effectively connected to each of such inductances whereby a uniform delay is effective throughout a signal band.

References Cited in the file of this patent

UNITED STATES PATENTS

| | | |
|---|---|---|
| 2,420,559 | Nelson | May 13, 1947 |
| 2,457,212 | Di Toro | Dec. 28, 1948 |
| 2,461,061 | Kallman | Feb. 8, 1949 |
| 2,522,731 | Wheeler | Sept. 19, 1950 |
| 2,704,829 | Clay | Mar. 22, 1955 |